(No Model.)  2 Sheets—Sheet 1.
R. B. DUNN.
FEED RACK.
No. 263,876. Patented Sept. 5, 1882.
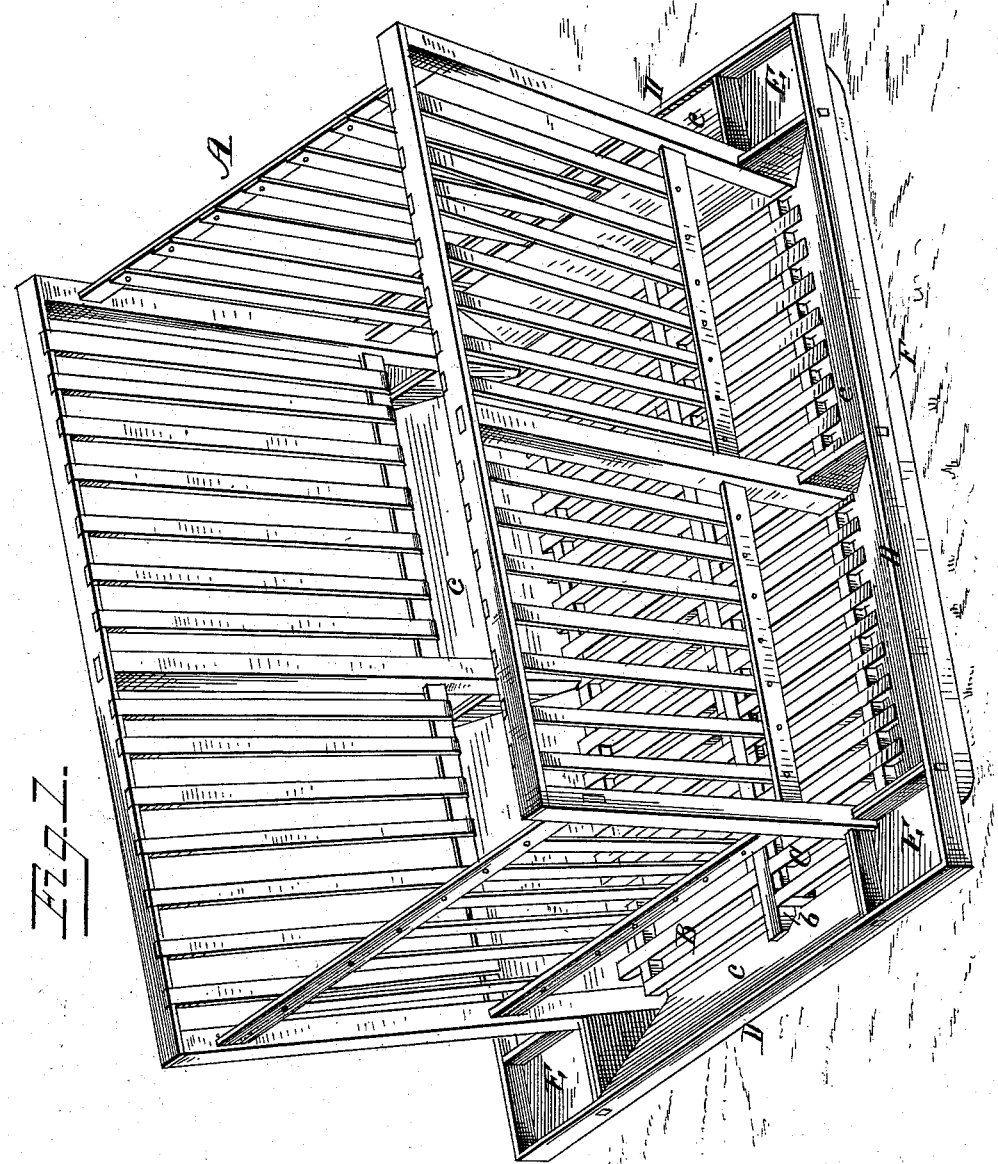
Witnesses
Franck L. Ourand
L. L. Miller
Inventor
Robert B. Dunn,
per Chas. H. Fowler,
Attorney (No Model.)  2 Sheets—Sheet 2.
R. B. DUNN.
FEED RACK.
No. 263,876. Patented Sept. 5, 1882.
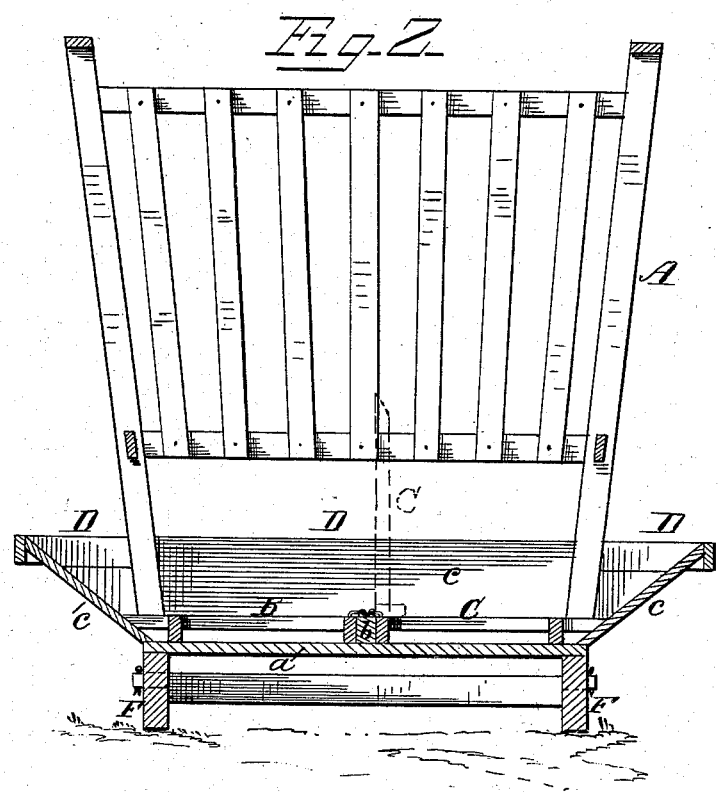
Witnesses,
F. L. Ourand
L. L. Miller
Inventor,
Robert B. Dunn,
per Chas. H. Fowler
Attorney

UNITED STATES PATENT OFFICE.

ROBERT B. DUNN, OF UNION, MARION COUNTY, MISSOURI.

FEED-RACK.

SPECIFICATION forming part of Letters Patent No. 263,876, dated September 5, 1882.

Application filed June 15, 1882. (No model.)

*To all whom it may concern:*

Be it known that I, ROBERT B. DUNN, a citizen of the United States, residing at Union township, in the county of Marion and State of Missouri, have invented certain new and useful Improvements in Feed-Racks; and I do hereby declare that the following is a full, clear, and exact description of the same, reference being had to the annexed drawings, making a part of this specification, and to the letters and figures of reference marked thereon.

Figure 1 of the drawings is a perspective view of my invention, and Fig. 2 a cross-section thereof.

The present invention has relation to that class of feed-racks used in the open fields or pastures to feed hay or fodder of any description to stock, and the object thereof is to provide such a rack that will be simple in construction, easily removed from place to place, and also prevent the great loss of feed which usually attends the use of ordinary styles of feed-racks. These objects I attain by the construction substantially as shown in the drawings, and hereinafter described and claimed.

In the accompanying drawings, A represents the feed-rack, constructed of open slat-work or otherwise, as desired, and having a closed bottom, *a*.

To the interior of the bottom *a* is secured a longitudinal strip, *b*, to which are removably hinged slatted false bottoms B C, for the purpose of saving the seed which ordinarily falls through the bottom onto the ground or is eaten by the stock. These bottoms B C can be swung up in a vertical position, as shown in dotted lines, Fig. 2, or removed from the feed-rack, as found desirable, when the rack is being cleaned or the accumulated seed under the false bottom being removed.

The feed-rack A has upon its four sides open mangers D, to which the hay or other feed is continuously fed by settling down from above as it is eaten out from below. These mangers D have slanting bottoms *c*, to cause the feed which is drawn out to slide back to the bottom of said mangers.

At each corner of the feed-rack is a grain or salt box, E, which forms the apex of the angle made by the four mangers D.

Upon the under side of the bottom *a* of the feed-rack A are connected suitable runners, F, to facilitate its removal from one place to another by hitching on a team to either end of the feed-rack and drawing it like a sled.

The feed-rack can be of any desirable size, and large enough to hold a ton or more of hay, and still be light enough to be moved about in the manner described.

Having now fully described my invention, what I claim as new, and desire to secure by Letters Patent, is—

The portable feed-rack A, having its four sides formed of open slat-work extending to the top thereof, and at its bottom around its four sides mangers D, having inwardly-slanting bottoms *c*, and at the corners grain or salt boxes E, said feed-rack having hinged slatted false bottoms B C, which are removably connected to a central longitudinal strip, *b*, substantially as and for the purpose set forth.

In testimony that I claim the above I have hereunto subscribed my name in the presence of two witnesses.

ROBERT B. DUNN.

Witnesses:
 MASON YATES,
 W. H. YATES.